Patented June 13, 1939

2,162,686

UNITED STATES PATENT OFFICE 2,162,686

METHOD FOR THE PREPARATION OF THIONOL

Floyd De Eds, San Francisco, Calif., Clyde W. Eddy, Pullman, Wash., and John O. Thomas, San Francisco, Calif., assignors to Henry A. Wallace, Secretary of Agriculture of the United States of America, and his successors in office No Drawing. Application January 28, 1939, Serial No. 253,450

1 Claim. (Cl. 260—243)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a method for the efficient conversion of phenothiazine to thionol (hydroxyphenthiazone) by a simple process of oxidation.

For treatment of infections of the urinary tract it is desirable that the antiseptic possess the following characteristics:

1. The therapeutic dose should be far below the toxic-margin of safety.
2. Ease of administering.
3. Stability.
4. Ready absorbability.
5. Non-injurious to digestive tract.
6. Non-destroyable before action.
7. Non-cumulative.
8. Absence of tolerance-development.
9. Ability to act in acid, neutral, or alkaline urine.

We have found that thionol meets these requirements. Although it acts as a urinary antiseptic in acid, neutral, or alkaline urine, it acts best in an acid urine possessing a pH value within the range pH 4.5 to pH 6.0.

Extensive research conducted on rabbits and rats have demonstrated that oral administration of thionol is safe and that urine containing thionol possessed bactericidal properties.

The advantages of the proposed method of converting phenothiazine to thionol (hydroxyphenthiazone) are threefold:

1. Simplicity of method.
2. Efficiency of method, the yield being at least 80%.
3. Purity of the product, thionol.

Upon oxidation by the procedure hereinafter described, phenothiazine is converted to thionol (hydroxyphenthiazone), having the following structural formula:

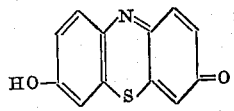

Synonyms for thionol are hydroxyphenthiazone, and, according to the old nomenclature employed by August Bernthsen (Ann., 230, 73–211, 1885), dioxythiodiphenylimid.

The procedure developed by us for the preparation of thionol is as follows:

The materials required for the conversion of 2 g. of phenothiazine are 200 cc. of ethyl alcohol, 80 cc. of concentrated hydrochloric acid, 1000 cc. of distilled water and 4 cc. of 30% hydrogen peroxide.

The conversion is best carried out in the following manner to obtain a product of highest purity. The phenothiazine is dissolved in the alcohol. The hydrochloric acid is added to the water, brought to a temperature of 80° C. and constantly stirred with a mechanical stirrer. The hydrogen peroxide is then added. While the temperature is maintained at 80° C. and the mixture vigorously stirred, the alcoholic solution of phenothiazine is added slowly at a constant rate of one or two drops per second, the addition being completed in forty-five minutes, and the total heating time being fifty-five to sixty minutes from the first addition of phenothiazine solution. The solution develops an intense red color. At the end of the specified heating time the solution is cooled under tap water and extracted with chloroform. The chloroform solution is concentrated to about 100 cc. by distillation, evaporated to dryness in a current air, and the residue is transferred to an Abderhalden dryer. When pulverized, a dark red, almost black powder results. The product has all the characteristics described by Bernthsen for dioxythiodiphenyl-imide.

Under appropriate conditions of time, temperature, and proportion of reagents, other oxidizing agents such as bromine, ferric chloride and potassium dichromate might be used in lieu of hydrogen peroxide. However, since the thionol is to be used therapeutically the use of hydrogen peroxide is preferable since no potential toxic residue, for example chromium, remains in the product.

We claim:

A method for the preparation of thionol from phenothiazine, which comprises adding substantially 80 cc. of concentrated hydrochloric acid to substantially 1000 cc. of distilled water, and thence adding substantially 4 cc. of 30% hydrogen peroxide, the while subjecting the mixture to agitation and a temperature of substantially 80° C., thence adding at a constant rate substantially 2 g. of phenothiazine dissolved in 200 cc. of alcohol, the while subjecting the mixture to a constant temperature for not more than fifteen minutes, thence subjecting the mixture to the action of a cooling medium, thence extracting the chloroform, thereby recovering the thionol present, thence removing the chloroform therefrom, and thence drying and pulverizing the residue.

FLOYD DE EDS.
CLYDE W. EDDY.
JOHN O. THOMAS.